United States Patent [19]

Stroby et al.

[11] Patent Number: 5,002,592
[45] Date of Patent: * Mar. 26, 1991

[54] WASTE TANK FOR A VACUUM SEWAGE SYSTEM

[75] Inventors: Lennart Stroby, Kristianstad; Ake Nilsson, Sölvesborg; Arne Ask, Åhus, all of Sweden; Gary Stahl, Winnebago, Ill.; Sven Oldfelt, Vaxholm, Sweden; Paul L. Dubler, Rockford, Ill.

[73] Assignee: Oy Wartsila AB

[*] Notice: The portion of the term of this patent subsequent to Sep. 12, 2006 has been disclaimed.

[21] Appl. No.: 334,002

[22] Filed: Apr. 4, 1989

Related U.S. Application Data

[63] Continuation-in-part of Ser. No. 160,694, Feb. 26, 1988, Pat. No. 4,865,631.

[51] Int. Cl.⁵ .............................................. B01D 19/00
[52] U.S. Cl. ...................................... 55/169; 55/182; 55/204; 55/216
[58] Field of Search .................. 55/169, 182, 191, 204, 55/216; 210/537

[56] References Cited

U.S. PATENT DOCUMENTS

| 1,755,780 | 4/1930 | Hawley | 210/537 |
| 2,671,527 | 3/1954 | Moon | 183/41 |
| 2,890,764 | 6/1959 | Arnold | 183/83 |
| 3,397,512 | 8/1968 | Webb | 55/204 |
| 3,590,560 | 7/1971 | Pall | 55/457 |
| 4,124,409 | 11/1978 | Gladden | 55/191 |
| 4,483,697 | 11/1984 | Deysson et al. | 55/204 |
| 4,865,631 | 9/1989 | Stroby et al. | 55/163 |

FOREIGN PATENT DOCUMENTS

| 3034400 | 3/1982 | Fed. Rep. of Germany | 55/216 |
| 2087932 | 12/1972 | France . | |

Primary Examiner—Charles Hart

[57] ABSTRACT

A waste tank for a vacuum sewage system installed in a transport vehicle comprises a receptacle portion for receiving sewage up to a predetermined maximum filling level. The tank defines an inlet opening for admitting air and sewage to the tank and an outlet opening for exhausting air from the tank. The inlet and outlet openings are above the maximum filling level of the tank. The tank also comprises an inlet separator that separates air and sewage entering the tank by way of the inlet opening using the kinetic energy of the sewage, and thereby dissipates kinetic energy of the sewage so that sewage entering the receptacle portion of the tank does not do so in a violent fashion, such as to contribute to vigorous movement of the sewage or cause splashing.

23 Claims, 6 Drawing Sheets

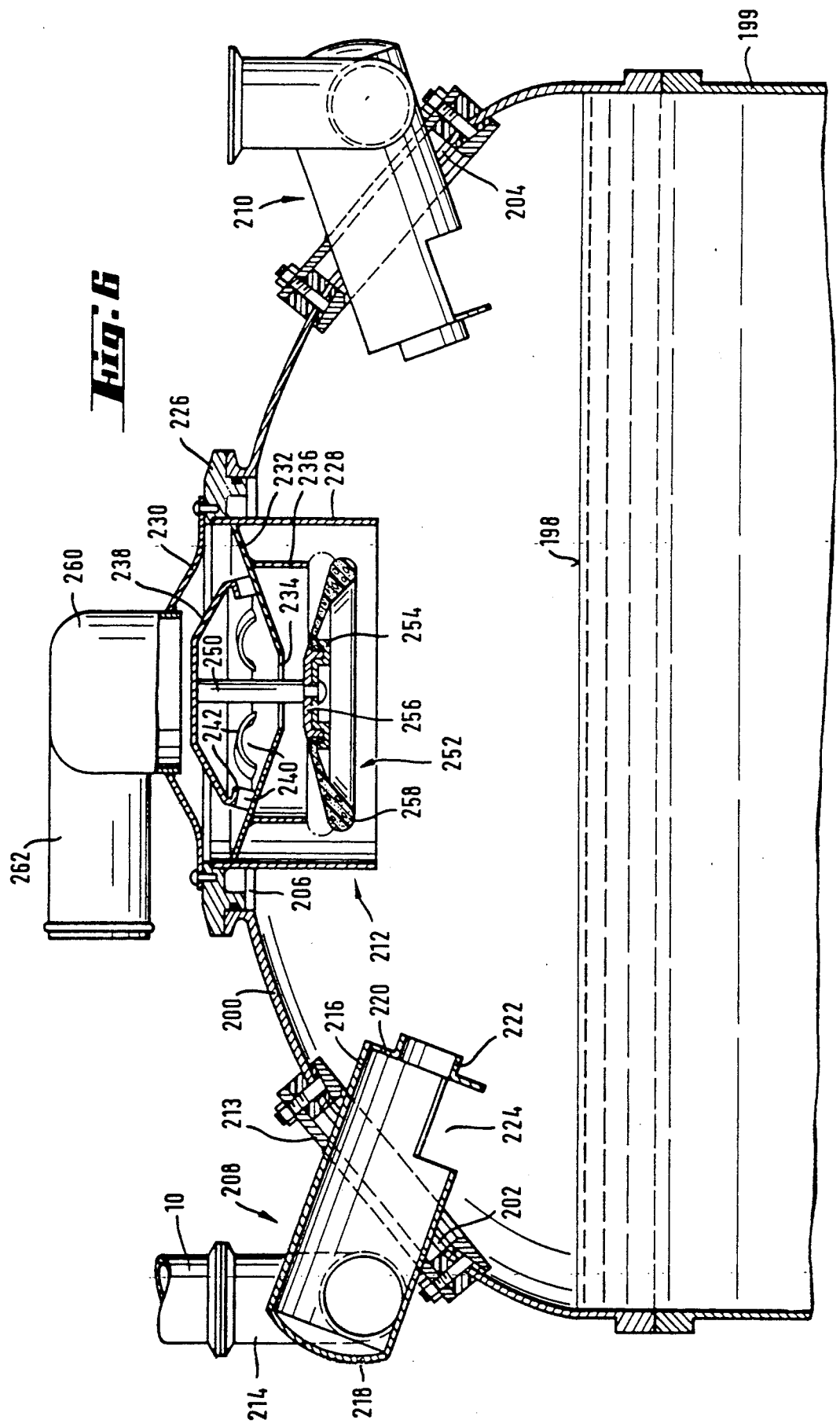

WASTE TANK FOR A VACUUM SEWAGE SYSTEM

CROSS-REFERENCE TO RELATED APPLICATION

This is a continuation-in-part of co-pending Pat. application Ser. No. 07/160,694 filed Feb. 26,1988., now U.S. Pat. No. 4,865,631 issued Sep. 12, 1989.

BACKGROUND OF THE INVENTION

This invention relates to a waste tank for a vacuum sewage system installed in a transport vehicle such as an aircraft, boat, bus or train, particularly a high-speed train.

A vacuum sewage system installed in a transport vehicle includes a waste tank for collecting and temporarily storing sewage. The tank has an inlet opening for connection through a sewer pipe to a source of sewage, such as a toilet, and admitting air and sewage to the tank, and an outlet opening for exhausting air from the tank. The outlet opening is connected through a duct to the suction side of a vacuum generator, for instance a blower, the pressure side of which vents to the atmosphere. Operation of the vacuum generator may be controlled by a pressure sensor, which is located in the duct immediately upstream of the vacuum generator, in the tank or in the sewer pipe, and normally functions to maintain a pressure difference between the tank and the interior of the vehicle above a threshold level, or to produce such a pressure difference when flushing of a toilet, or another sewage-supplying operation, is initiated. In the case of a vacuum sewage system installed in an aircraft, the vacuum generator is not needed when the pressure outside the aircraft cabin is sufficiently low to create the desired pressure difference.

In operation of such as vacuum sewage system connected to a toilet, flushing of the toilet is initiated by actuating a flush button. The pressure sensor disables the flush button from initiating a flushing cycle if the pressure difference sensed by the pressure sensor is below the threshold value. The tank is also provided with a level sensor for disabling the flush button when the tank is full. When a flushing cycle is initiated, a discharge valve connected between the toilet bowl and the sewer pipe is opened. The pressure difference between the interior of the toilet bowl and the interior of the sewer pipe causes sewage in the toilet bowl to be propelled from the bowl into the ser pipe. Air enters the sewer pipe behind the sewage and pushes it towards the tank. The discharge valve is held open for a predetermined time and then closes. After the discharge valve is closed, the sewage in the sewer pipe continues to travel toward the tank as the air upstream of the sewage expands. The flushing cycle is then complete and a new flushing cycle may take place. Preferably, it takes only one flushing cycle to transport sewage from the toilet to the waste tank. When the sewage enters the waste tank, it does so at quite a high speed. Accordingly hard objects, such as small bottles, may impinge on the tank wall with a substantial impact and there is a danger that the tank will be damaged, especially in the case of a vacuum sewage system installed aboard an aircraft since, in order to minimize weight, the waste tank may be of relatively flimsy construction.

It has been proposed that the inlet opening for the waste tank of an aircraft vacuum sewage system be formed in the horizontal top wall of the holding tank and be coupled to the sewer pipe by a connection fitting that makes the sewage enter the tank in a direction vertically downwards. In accordance with this proposal, the outlet opening is spaced from the inlet opening and is provided with a separator for preventing water form leaving the tank.

The proposed aircraft vacuum sewage system is subject to disadvantage, in that forces caused by aircraft movement may result in quite vigorous movement of the sewage in the tank, and this may cause sewage to enter the separator and block it. The pressure drop across the separator would increase, which may result in too high a pressure in the tank and in the sewer pipe. If the toilet was then flushed, there might not be sufficient vacuum in the waste tank for the sewage in the toilet bowl to be propelled completely into the sewer pipe Consequently, there would be an increased probability that the discharge valve would be blocked. Moreover, sewage that has entered the separator might be pushed through the separator into the blower, which might result in damage to the blower. In order to avoid blockage of the separator, the level sensor should be placed so as to disable the flush button when the level of sewage in the tank reaches about 25 cm below the top of the tank. Typically, the height of the tank would be only about 75 cm, and therefore a large proportion of the volume of the tank would not be available for storage of sewage.

SUMMARY OF THE INVENTION

It appears that the separator of the waste tank of the proposed aircraft vacuum sewage system would be blocked because sewage and air entering the waste tank through the inlet opening impinge on the surface of the sewage in the tank and create a wave, which enlarges as the air expands. As the wave enlarges, it propagates away from the inlet opening towards the outlet opening and enters the separator.

A preferred embodiment of the invention is a waste tank for a vacuum sewage system installed in a transport vehicle. The tank comprises a receptacle portion for receiving sewage up to a predetermined maximum filling level. The tank defines an inlet opening for admitting air and sewage to the tank and an outlet opening for exhausting air from the tank. The inlet and outlet openings are above the maximum filling level of the tank. The tank also comprises an inlet separator that separates air and sewage entering the tank by way of the inlet thereby using the kinetic energy of the sewage, and thereby dissipates kinetic energy of the sewage.

Dissipating kinetic energy of the sewage in the inlet separator ensures that the sewage does not enter the receptacle portion of the tank in a violent fashion, such as to contribute to vigorous movement of the sewage or causes splashing, which might coat level detectors, for example, sand leave a residue that cannot readily be removed once it dries.

Preferably, the inlet and outlet openings are defined by a dome structure which is in open communication with the receptacle portion of the tank and projects upwardly from the receptacle portion. By providing the inlet and outlet openings in the dome structure, which may be the upper end of a vertical tank, the overall volume of the tank is minimized while the proportion of the volume of the tank that is available for holding sewage is maximized. Moreover, the inlet and outlet openings are close together, so that if sewage entering the tank creates a wave, by the time that the wave has enlarged substantially it will be beyond the outlet opening. A closure device may be provided to ensure that sewage will not enter the outlet opening.

BRIEF DESCRIPTION OF THE DRAWINGS

For a better understanding of the invention, and to show how the same may be carried into effect, reference will now be made, by way of example, to the accompanying drawings in which:

FIG. 6 illustrates another form of waste tank that may be included in the vacuum sewage system.

In the drawings, like reference numerals designate like components.

DETAILED DESCRIPTION

The invention will now be described with reference to an aircraft, but it should be understood the application of the invention is not limited to aircraft. The invention can be used as well in other vehicles in particular in boats, buses and trains. In an aircraft at an altitude such that there is a difference of at least about 250 mbar between the cabin pressure and the ambient pressure, vacuum for operating the system is available directly from the ambient atmosphere. Typically, cabin pressure is approximately equal to ambient pressure at an altitude of about 2,400 m, and sufficient pressure difference will exist when the aircraft is at an altitude greater then about 5,000 m.

Figure 1:
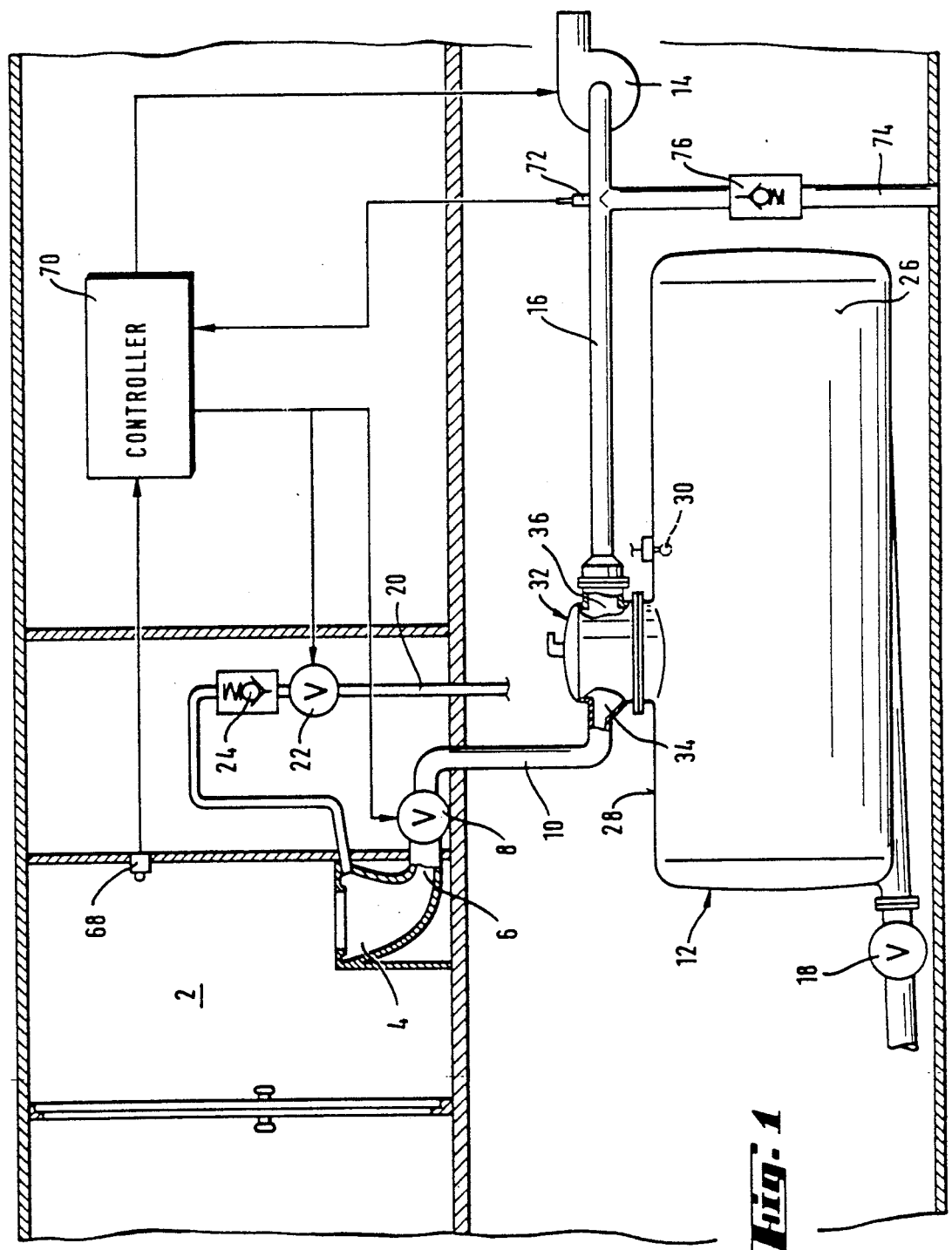
FIG. 1 is a diagrammatic illustration of part of an air equipped with a vacuum sewage system, which includes a waste tank.

The aircraft that is partially illustrated in FIG. 1 includes at least one toilet compartment 2 equipped with a vacuum toilet. The vacuum toilet comprises a waste-receiving bowl 4 which defines an interior space for receiving waste material and has an outlet opening 61. The outlet opening is connected to one side of a discharge valve 8. The opposite side of the discharge valve is connected through a sewer pipe 10 to a waste tank 12. The discharge valve 8 controls flow of material from the bowl 4 to the pipe 10 and the waste tank 12. An electrically driven blower 14 has its suction side connected to the tank 12 by way of an exhaust duct 16, and has its pressure side connected to the ambient atmosphere. The tank is also provided with a valve 18 or similar means for emptying the tank.

A flush button 68 is installed in the toilet compartment 2 and, when pressed, applied a signal to a flush controller 70. The controller responds to the signal provided by the flush button 68 by causing the discharge valve 8 to open. The controller 70 also controls operation of the blower 14. A pressure sensor 72 senses the pressure in the vacuum sewage system at a location that is normally in open communication with the interior space of the sewer pipe 10. For example, the pressure sensor might be positioned in the exhaust duct 16, just upstream of the blower. The pressure sensor provides a signal representing the difference between the pressure in the interior space of the sewer pipe 10 and the pressure in the air raft cabin. The controller 70 responds to a signal indicating that the pressure difference has fallen below a threshold level by energizing the blower, so that a pressure difference above the threshold level is maintained substantially continuously. Alternatively, the controller might be programmed to energize the blower only when the pressure difference is below the threshold value and the flush button has been pressed, so that a pressure difference above the threshold level is maintained on an intermittent, as needed, basis. When the aircraft is at an altitude such tat the difference between the cabin pressure and the ambient pressure is greater than about 250 mbar, the ambient atmospheric pressure, which is communicated to the tank by way of a by-pass duct 74 and a check vale 76, is sufficiently low to create the desired pressure difference, and accordingly the blow is not energized.

A rinse water supply pipe 20 opens into the bowl 4 by way of a spray nozzle arrangement adjacent the rim of the bowl 4. The rinse water supply pipe 20 is connected to a source of water under pressure. A remote-controlled, solenoid-operated or pneumatically-operated, rinse water valve 22 is connected in the water supply pipe 20. A vacuum breaker valve 24 is disposed downstream of the valve 22, to prevent reverse flow in the pipe 20 in the event that the pressure upstream of the valve 24 falls below the pressure in the water receiving bowl.

The waste tank shown in FIG. 1 has a generally cylindrical receptacle portion, which is disposed horizontally, os that it is generally circular in vertical cross-section. The diameter of the tank typically is in the range from about 45 cm to about 180 cm,. and the tank has a wall 26 which includes a top wall portion 28 extending over substantially the entire length of the tank. A lvel sensor 30 is positioned slightly beneath the top wall portion 28. When the level of sewage in the tank reaches the level sensor 30, the level sensor provides a signal to the controller 70 for maintaining the discharge valve 8 in its closed condition.

The tank 12 also has a generally cylindrical dome structure 32 which projects upwardly from the top wall portion 28. The dome structure 32 may be about 15 to 30 cm in diameter and 20 to 30 cm high. Thus, the tank has a horizontal linear dimension in one direction that is from about 1.5 to 12 times a horizontal linear dimension of the dome. The length of the tank need to be greater than the diameter of the dome structure, but generally the length of the tank will be substantially greater than the diameter of the dome structure. For example, the tank may typically be 75 to 95 cm long, although it may be considerably longer, e.g. 200 cm. therefore, in the case of a horizontally-disposed cylindrical tank, the horizontal sectional area of the dome is less than about 0.6 times the maximum horizontal sectional area of the tank.

The dome structure defines an inlet opening 34 which is connected to the sewer pipe 10 and an outlet opening 36 which is connected to the du t 16. The sewer pipe 10 is horizontal where it opens into the dome 32, and accordingly the flow of sewage and air that enters the dome by way of the sewer pipe 10 is directed horizontally.

The dome structure is provided with an entrance box 78 (FIg. 2), which is connected to the sewer pipe 10; The box 78 is substantially circular in vertical cross section, and its diameter increases in the direction of flow from the sewer pipe 10. Therefore, the velocity of air flowing through the pipe 10 is reduced as it enters the entrance box. A vertical deflector plate 40 is mounted in the dome 32 to intercept the flow of sewage and air.

Figure 3:
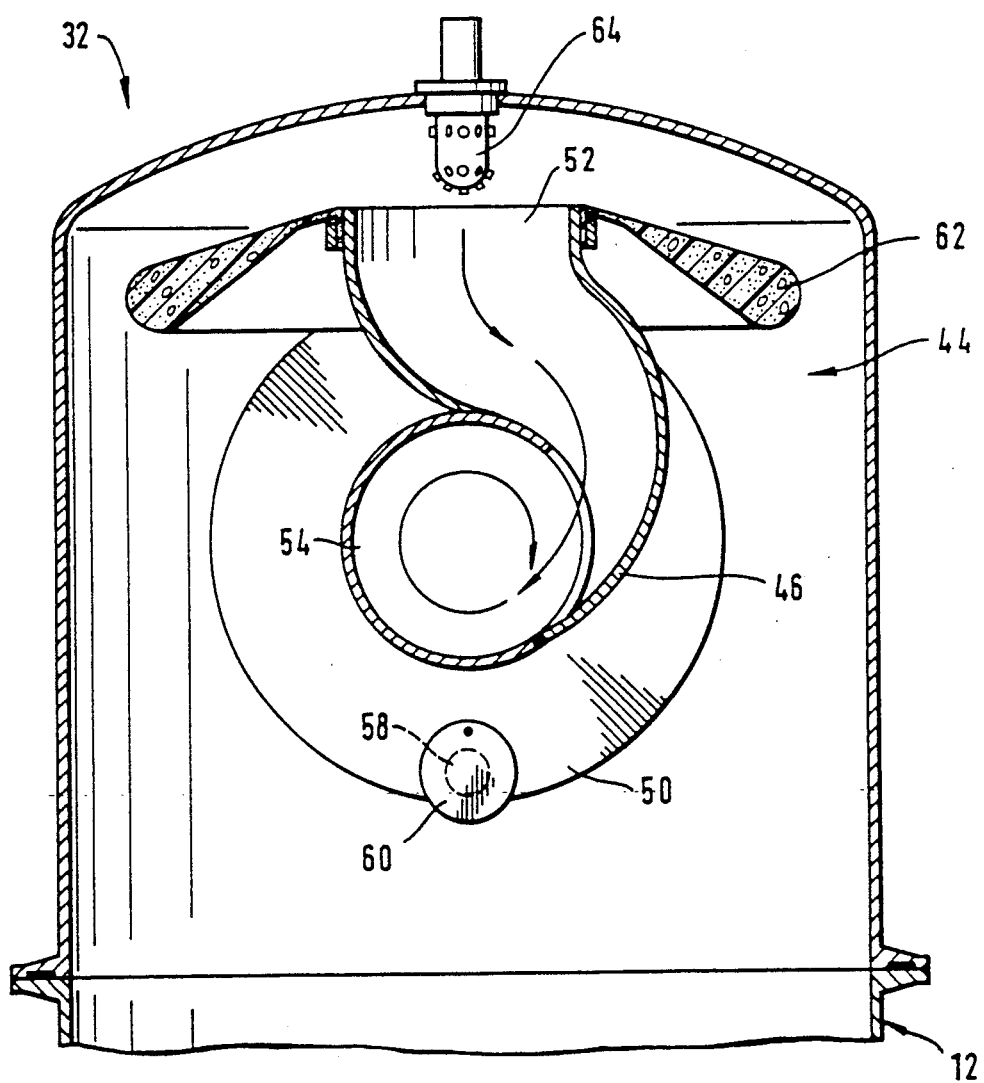
FIG. 3 is a sectional view taken on the line III—III of FIG. 2.

The outlet opening 36 is defined by a sleeve 42, which also is horizontal. The sleeve 42 accommodates a cyclonic separate 44 which has an inlet duct 46 (also shown in FIG. 3) inside the dome and an outlet duct 48 outside the dome. The inlet duct 46, which has an inlet port 52 near the top of the dome and opening upwards, is connected to the outlet duct 48 by a duct 54 and a separation section 50. The outlet duct 48 is connected to the exhaust duct 16. The action of the blower 14 draws air entering the dome from the sewer pipe 10 under the deflector plate and upwardly toward the top of the dome. At the top of the dome, the air enters the inlet port 52 and is drawn sequentially through the inlet duct 46, the duct 54, the separation section 50 and the outlet duct 48. The air passing through the dome structure therefore follows a serpentine path. Mist particles entrained in the air flow will follow this same path and will enter the inlet duct 46. As shown in FIG. 3, the walls of the inlet duct 46 converge in accordance with a spiral form, and accordingly air that enters the duct 54 from the inlet duct 46 has a strong rotational component of velocity about the central axis of the duct 54. Therefore, air passes through the duct 54 along a helical path. The outlet 48 is axially aligned with the duct 54 but is spaced therefrom by a distance of about 6 cm. The separation section surrounds the needs of the two ducts 48 and 54. When air, with mist particles entrained therein, leaves the duct 54, the mist particles are thrown away from the common axis of the ducts 48 and 54 by centrifugal force and are thereby separated from the air. The mist particles hit the interior surface of the separation section 50, where they form a film, and he thus-collected liquid is returned to the tank by way of a drain passage 58. The drain passage 58 is provided with a closure flap 60 which stops air from being drawn into the separation section by way of the drain passage.

Larger droplets of water and small particles of sewage have sufficient momentum that when the air flow changes direction in order to pass under the deflector plate and upwards towards the top of the dome, the droplets and particles do not change direction but continue to travel downwards into the tank. The speed of these droplets and particles decreases because they are no longer entrained in the air flow. Somewhat smaller particles and droplets are separated from the air flow as it passes to the cyclonic separator. More massive particles and lumps of sewage have sufficient momentum that the strike the deflector plate and fall at relatively low speed into the tank. Any small hard objects entrained in the flow of sewage also strike the deflector plate, and therefore they do not impinge at high speed on the wall of the tank.

In a conventional waste tank for a vacuum sewage system, separation of sewage from the air that propelled the sewage into the tank is achieved in the tank by the action of gravity, which causes more dense material (sewage) to move to a position have a lower gravitational potential and less dense material (air) to move to a position having a higher gravitational potential, so as to minimize the total gravitational potential energy of the air/sewage system. By use of the deflector plate, the kinetic energy of the sewage entering the tank is used to achieve a more efficient separation than is achieved by gravity alone, and in so doing the kinetic energy of the sewage is dissipated. consequently, the sewage entering the tank does not cause violent splashing or create waves.

There is, of course, a possibility that small particles of sewage will enter the cyclonic separator 44 with the air flow and be separated therefrom in the separation section. In order to keep the interior of the separator clean, its internal surfaces may be coated with PTFE or similar non-stick material and spray nozzles 66 are provided for periodically scouring and rinsing the interior surface of the cyclonic separator, e.g. when the tank is emptied.

There is also a possibility that wave motion of sewage in the tank due to movement of the aircraft would cause sewage to enter the dome. Escape of wave-borne sewage from the dome by way of the cyclonic separator is prevented by a reversing annular closure member 62. The closure member, which is less dense than sewage, is made of silicone rubber and its thickness increases from its inner periphery towards its outer periphery. The inner periphery of the closure member is connected to the periphery of the inlet port 52. Adjacent the inner periphery, the closure member is sufficiently thin that it can flex when the outer periphery of the closure member is urged upwards, for example if a wave of sewage enters the dome and reaches the level of the closure member. The outer periphery of ht enclosure member than seals against the top of the dome and prevents sewage from leaving the dome through the duct 46. In order to keep the interior of the dome clean, its internal surfaces may be coated with PTFE or similar non-stick material and a spray nozzle 64 is mounted immediately above the inlet port 52 for scouring and rinsing the inlet duct 46 of the separator, the closure member 62 and the interior surface of the dome 32.

In a modification of the dome structure (not shown), the entrance box may be outside the cylindrical wall of the dome structure, in which cause a portion of the cylindrical wall serves as the deflector plate. The entrance box communicates with the interior space of the dome structure through an opening in the cylindrical wall.

Figure 2:
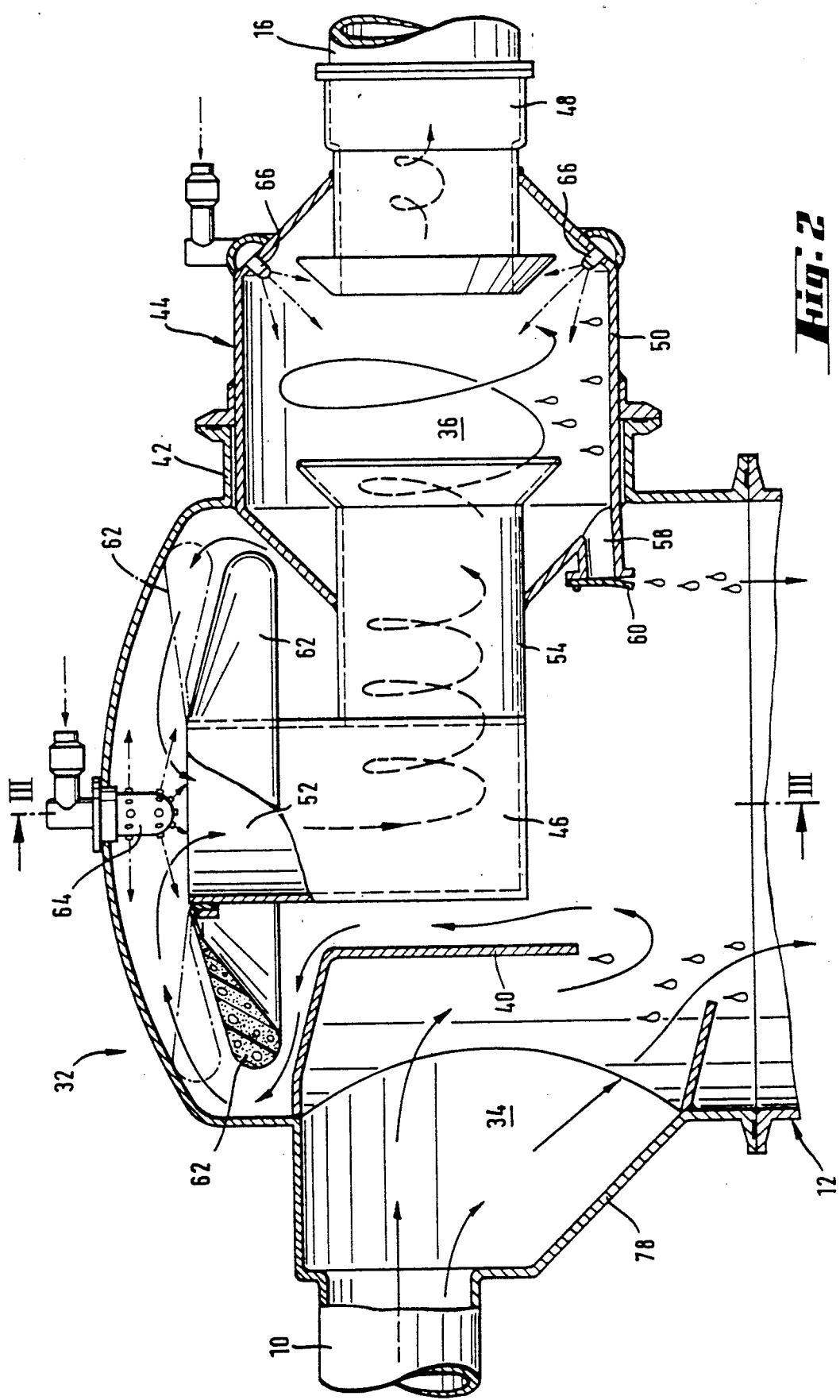
FIG. 2 is an enlarged view of part of the waste tank.

In the dome structure shown in FIG. 2, and in the modification mentioned above, the sewer pipe 10 is disposed substantially radially with respect to the dome structure. Alternatively, the sewer pipe may be disposed transversely to the radius of the dome structure, in which cause a side wall of the entrance box serves as the deflector plate.

Figure 4:
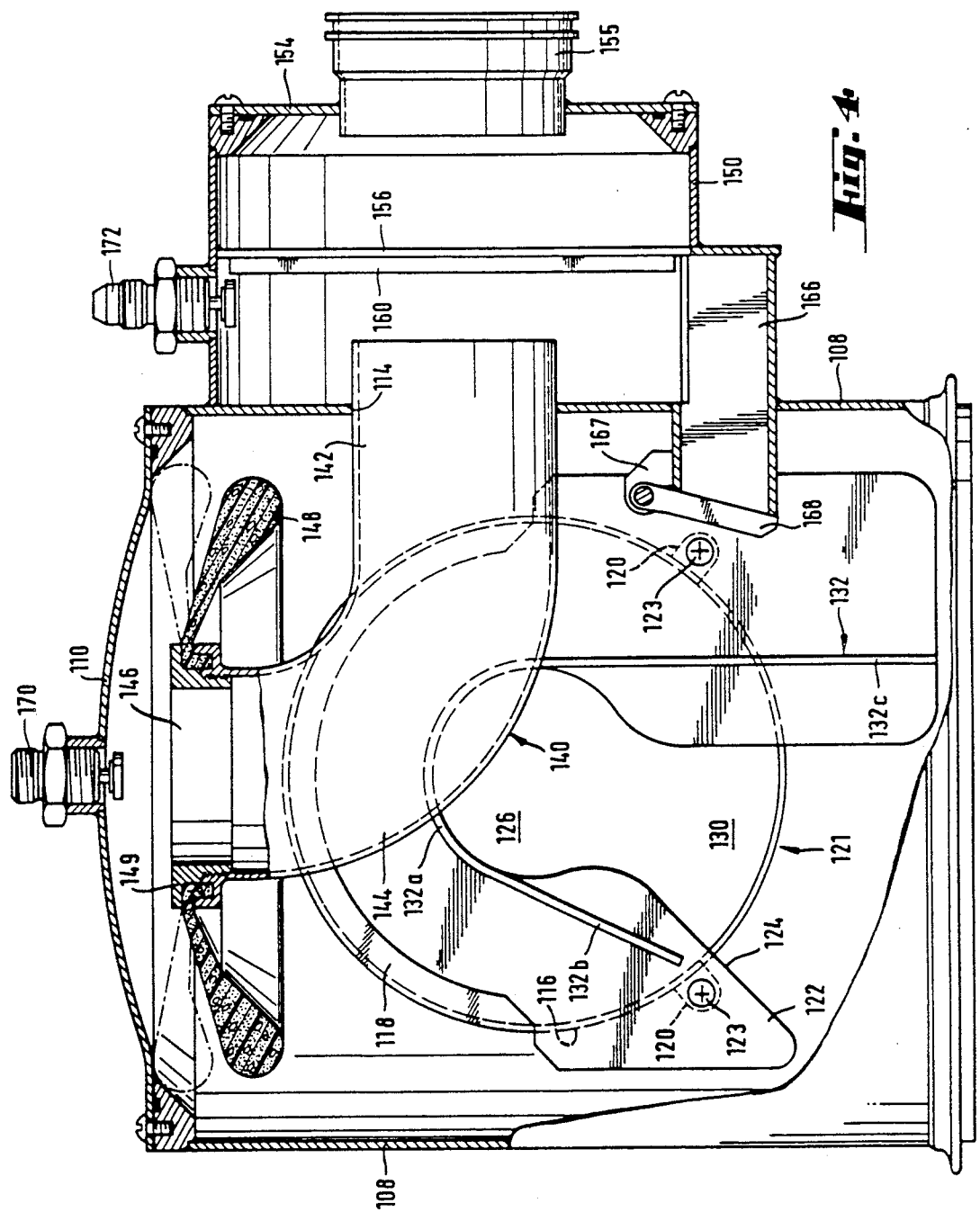
FIG. 4 is a vertical, part-sectional view of an alternative form of the part shown in FIGS. 2 and 3.
Figure 5:
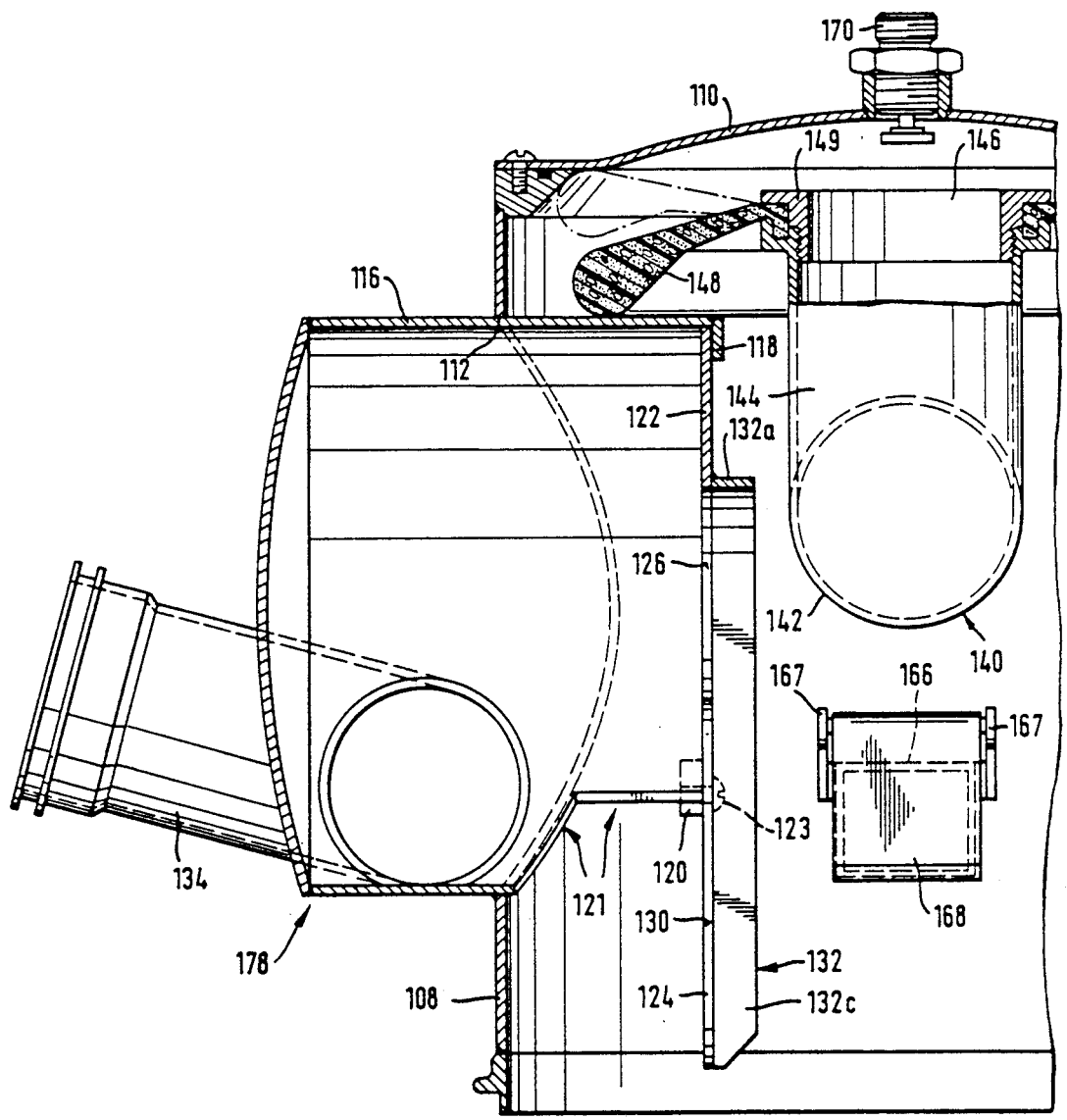
FIG. 5 is a partial vertical sectional view taken at right angles to the section plane of FIG. 4.

FIGS. 4 and 5 illustrate an alternative form of the dome structural The dome structure shown in FIGS. 4 and 5 has a cylindrical wall 108 and a top 110 that is slightly convex upwards. The wall 108 is formed with two circular openings 112 (FIG. 5), 114 (FIG. 4). A separator tube 116 is fitted in the opening 112 and extends radially of the wall 108. The tube 116 is closed at its outer end. At its inner end, the tube 116 is provided with a partial flange 118 and two mounting ears 120 (FIG. 4). An outlet slot 121 is formed in the tube 116 at its inner end and extends about one-fourth of the way around the periphery of the tube, from one mounting ear to the other. A vertical plate 122 partially closes the inner end of the tube 116. The upper edge of the plate 122 is curved, and the radius of curvature of the upper edge is equal to the radius of the tube 116. The upper edge of the plate 122 abuts the inner surface of the tube 116 and that face of the plate 122 which is nearer the central axis of the dome engages the flange 118. The plate 122 is attached to the separator tube 116 by screws 123 that extend through the plate and engage the mounting ears 120. The plate 122 is generally U-shaped, defining a notch 124 having a substantially circular portion 126 that lies on the central axis of the cylindrical sleeve and a slot-form portion 130 that extends radially of the tube 116 from the circular portion 126. A plate 132 is welded to the plate 122 and extends about the notch 124.

The tube 116 defines a separation chamber. An inlet tube 134, which is connected to the vacuum sewer pipe 10, debouches, into the separation chamber substantially tangentially. The diameter of the circular portion 126 of the notch 124 is equal to the diameter of the inlet tube 134. Preferably, the diameter of the inlet tube 134 is about 2 inches (5.05 cm) and the diameter of the tube 116 is about 5.6 inches (14.22 cm). The overall axial length of the separation chamber is about 10.5 cm, and he axial length of the separation chamber from the axis of the inlet tube 134, at the point at which the tube 134 opens into the separation chamber, to the plate 122 is about 7 cm.

An outlet tube 140 is mounted in the opening 114. The outlet tube has a straight portion 142 that passes horizontally through the opening 114, and a curved portion 144 that extends from the inner end of the straight portion 142 and curves upwardly through an angle of 90°, so that it defines an inlet opening 146 that is slightly below the top 110 of the dome structure. A reversing closure member 148, similar to that described with reference to FIGS. 2 and 3, is mounted on the upper end of the tube portion 144 by a clamping ring 149. At its outer end, the outlet tube 1430 opens into an outlet chamber, which is defined by a sleeve 150 of larger diameter than the outlet tube 140. The outlet chamber is generally cylindrical, coaxial with the tube portion 142, and is provided at its outer end with an end plate 154, which carries an outlet connection 155 for connecting to the exhaust duct 16. A baffle plate 156 is mounted in the outlet chamber slightly spaced from the omelet opening of the outlet tube 140. The baffle plate 156 has the form of a vertical strip. At its top and bottom, the width of the plate 156 is slightly smaller than the diameter of the tube 140, and the width of the plate increases smoothly from top and bottom to a maximum value, rather larger than the diameter of the tube 140, at the level of the central axis of the outlet chamber. Ribs 160 extend along the two opposite edges of the baffle plate. At the lower end of the baffle plate is a collection trough 166 that extends through the wall 108. The trough is rectangular in section, and inward of the wall 108 it is covered at the top by a flapper mounting bracket form which two mounting ears 167 extend upwardly, at opposite respective sides of the trough. The mounting ears 167 support a drain flapper 168 for pivotal movement about a horizontal axis.

Sewage and air flowing through the sewer pipe 10 enter the separation chamber through the inlet tube 134. Because the inlet tube debouches, substantially tangentially into the separation chamber, the sewage and air enter the separation chamber with a substantial peripheral velocity component, and pass through the separation chamber along a substantially helical path. Due to centrifugal force, the solid and liquid waste material are thrown strongly towards the periphery of the separation chamber, and therefore the material that leaves the separation chamber through the circular portion 126 of the notch 124 is predominantly air, with relatively little waste entrained therein, and the material that leaves the separation chamber through the outlet slot 121 and the slot-form portion 130 of the notch 124 is predominantly waste. The portion 132s of the plate 132 that extends along the periphery of the circular portion 26 of the notch 124 acts as a partial draft tube, while the portion 132b acts as a deflector plate, which is struck by waste leaving the separation chamber through the notch 124 with a large peripheral component of velocity. The waste that strikes the deflector plate falls from the deflector plate into the tank. Some waste is deposited on the portion 132a of the plate and runs down the portions 132b and 132c and falls into the receptacle portion of the tank.

In principle, two separate openings could be provided for discharging air and waste respectively from the separator tube 116. However, the notch avoids the possibility of long objects, such as plastic bags, being caught on a web between two separate openings.

At the inner end of the separator tube 116, the axial component of velocity of sewage is quite small but it is not negligible. The flange 118 prevents the sewage reaching the inner end of he tube 116 from deflecting the upper edge of the plate 122 away from the tube 116.

The air leaving the separation chamber is drawn upwardly, around the closure member 148 and into the outlet tube 140, and passes through the outlet chamber, around the baffle plate 156, to the outlet connection 155. Drops of liquid and small particles of solid material that are entrained in the air flow entering the outlet chamber strike the baffle plate 156 and are caught on the ribs 160 and fall into the collection trough 166. During periods in which there is flow of air through the outlet tube 140, the pressure difference between the interior of the dome structure and the outlet chamber maintains the flapper 168 closed. When there is no flow through the outlet tube, the drain flapper is able to open, allowing the solid and liquid material in the collection trough to fall into the tank.

The interior surfaces of the dome and the outlet chamber are provided with a coating of PTFE so as to resist adhesion of solid material. Similarly, the plate 122 is coated with PTFE. The interior surface of the sleeve 116 is smooth gut is not coated, in order to ensure that sufficient loss of kinetic energy occurs when the sewage passes through the inlet chamber.

The dome and the outlet chamber are provided with rinse water connections 170, 172 which are connected to a source of rinse water for spraying the interior of the dome and the interior of the outlet chamber form time to time in order to remove material lodged therein.

The invention is not limited to use of a dome structure of which the horizontal sectional area is substantially smaller than the horizontal sectional area of the tank. In the case of FIG. 6, the dome structure is provided by the top end of a vertically-disposed cylindrical tank.

The tank that is partially shown FIG. 6 has a top wall 200 which is formed with three openings 202, 204 and 206. The openings 202 and 204 receive inlet devices 208 and 210, whereas the opening 206, which is at the top of the tank, receives an outlet device 212. The inlet devices 208 and 210 ae identical, and therefore only the inlet device 208 will be described. The inlet device 208 is above the maximum filling level 198 of the tank and comprises a mounting plate 213, which is bolted to the top wall 200 of the tank, and a separator tube 216 fitted in an opening in the mounting plate 213. An inlet tube 214 opens into the tube 216 substantially tangentially. Preferably, the diameter of the inlet tube 214 is about 2 inches (5.08 cm) and the diameter of the separator tube 216 is about 3 inches (7./62cm). The separator tube is about 8–10 inches (20.32–25.4 cm) long. At its outer end, the separator tube 216 is provided with a cover plate 3218. The inner end of the separator tube is formed with an internal flange 220, form which a short draft tube 222 extends coaxially with the separator tube. The diameter of the draft tube 222 is equal to the diameter of the inlet tube 214. A lateral opening 224 is provided in the wall of the separator tube.

the outlet device 212 is secured to the top wall 200 by an annular mounting flange 226. A cylindrical sleeve 228 extends downwards from the mounting flange 226, and a cover plate 230 extends over the opening defined by the flange 226. A frustoconical plate 232 is secured to the cylindrical sleeve and slopes downwards towards the central axis of the cylindrical sleeve. The frustoconical plate 232 defines an opening 234. A further cylindrical sleeve 236 is secured to the frustoconical plate 232, coaxially with the cylindrical sleeve 228, and extends downwardly from the frustoconical plate 232. A final separator plate 238 is mounted on top of the frustoconical plate 232. The final separator plate is concave towards the opening 234 in the frustoconical plate 232, and six part-circular notches 240 are equiangularly distributed about the periphery of the plate 238, whereby six passages are formed between the upper surface of the plate 232 and the final separator plate. The final separator plate is provided with an internal flange 242 about each of the notches 240. A rod 250 extends downwardly from the final separator plate 238, through the opening 234, and carries a closure valve assembly 252 at its lower end. The closure valve assembly comprises a pair of clamping discs 254, 256 and an annular reversing closure member 258, similar to that described with reference to FIGS. 2 and 3, clamped at its inner periphery between the discs 254, 256.

The cover plate 230 defines an opening in which an outlet fitting 260 is mounted. This outlet fitting is provided with an outlet tube 262, which is connected to the exhaust duct 16.

When the FIG. 6 tank is installed, the sewer pipe 10 is connected to the inlet device 208 and a second sewer pipe (not shown) is connected to the inlet device 210.

Air and sewage enter the inlet device 208 intermittently by way of the inlet tube 214. Because the inlet tube debouches substantially tangentially into the separator tube 216, the sewage and air enter the separator tube with a substantial peripheral velocity component and are separated therein, in the manner described with reference to FIGS. 4 and 5. The material that leaves the separator tube through the draft tube 222 is predominantly air, with relatively little waste entrained therein, and the material that leaves the separator tube through the lateral outlet 224 is predominantly waste. Due to friction between the waste and the internal surface of the separator tube, and the viscosity of the waste, most of the kinetic energy of the waste is dissipated as the waste passes through the separator tube. Since the axis of the separator tube 216 is nearly horizontal and the outlet 224 is at the bottom of the tube 216, the waste readily falls from the separator tube. Air with particles of solid material and droplets of water entrained therein is drawn from the draft tube past the cylindrical sleeve 228, around the periphery of the closure member 258 and into a duct defined by the sleeve 236. The air passes through the opening 234, then through the openings 0 and into the outlet fitting 260. The air must follow a serpentine path in order to reach the outlet fitting 260, and the particles and droplets impinge on the surfaces that define that path, so that they are removed from the flow of air. The flow of air through the outlet device 212 is intermittent, and droplets and particles that impinge on the final separator plate 238 are able to fall back into the tank when there is no flow of air through the outlet device.

The plates 232 and 238 are coated with PTFE, which promotes deposit of mist in drops rather than in a sheet, and allows the drops to move readily by gravity. The angle of the generatrix of the frustoconical plate 232 to horizontal must be sufficient for the drops to run down the upper surface of the plate 232 under gravity. However, the angle should not be so large that the plate 232 has a substantial vertical extension, since this would reduce the maximum usable volume of the tank. It has been found that a suitable angle is about 20°.

The reversing closure member shown in FIG. 6 operates in essentially the same way as that described with reference to FIGS. 2 and 3. It should be noted, however, that the inner periphery of the closure member is not secured about the outlet port, as in the case of FIGS. 2 and 3, and that the outer periphery of the closure member engages the lower end of the sleeve 236 in order to seal the outlet of the tank.

It will be appreciated that the present invention is not restricted to the particular embodiments that have been described and illustrated, and that variations may be made therein without departing from the scope of the invention as defined in the appended claims and equivalents thereof. In particular, the invention is not limited to a vacuum sewage system for aircraft. The invention is not limited to the specific dimensions referred to above. Thus, in the case of FIGS. 4 and 5 or FIG. 6, it is not essential that the diameters of the inlet tube and the separator tube be as stated. It is necessary only that the relative diameters be such that the inlet tube enters the separator tube at a substantial angle to the radius and that cyclonic separation with dissipation of kinetic energy take place. For example, in the case of FIG. 6, the separator tube may be from 2.5 inches (6.35 cm) to 5 inches (12.7 cm) in diameter. The separator tube should be sufficiently long that the sewage executes at least one full turn about the separator tube before leaving the separator tube. It is not essential that the inlet and outlet openings be defined by a dome structure or otherwise be close together. For example, the inlet and outlet openings may be at opposite ends of a horizontally-disposed, cylindrical tank. If the inlet and outlet openings are not defined by a dome structure above the receptacle portion of the tank, the maximum filling level of the tank must be sufficiently low that sewage will not enter the inlet or outlet opening due to wave motion. Wave motion of sewage in the receptacle portion may be suppressed by use of baffles inside the tank. If the inlet and outlet openings are not close together, gravitational separation is enhanced due to the greater residence time of air in the tank. This may permit use of an outlet device similar to that shown in FIG. 6 in conjunction with an inlet device that does not rely on centrifugal force to achieve separation. For example, the inlet device may be an entrance box similar to that described with reference to FIG. 2. The sewer pipe would debouch horizontally into the entrance box, and a side wall of the entrance box would serve as a deflector plate.

We claim:

1. A waste tank for a vacuum sewage system installed in a passenger transport vehicle for serving the sanitation needs of the vehicle's passengers or crew and being operable when the vehicle is in motion, said tank comprising a receptacle portion for receiving sewage upon to a predetermined maximum filling level, the tank defining an inlet opening for admitting air and sewage to the tank and an outlet opening for exhausting air from the tank, the inlet opening and the outlet opening being above the maximum filling level, and the tank also comprising an inlet device which is coupled to the inlet opening and is effective to separate air and sewage entering the tank using the kinetic energy of the sewage, and thereby dissipate kinetic energy of the sewage, so that the sewage is retained in the tank.

2. A waste tank according to claim 1, wherein the inlet device is a cyclonic separator.

3. A waste tank according to claim 2, wherein the cyclonic separator comprises a separator tube having first and second opposite ends and a central axis, an inlet tube for receiving sewage and air and which debouches substantially tangentially into the separator tube at the first end thereof, and a draft tube connected to the separator tube and aligned substantially coaxially therewith.

4. A waste tank according o claim 3, wherein the inlet device comprises an end plate at the second end of the separator tube, he end plate being formed with at least one opening for allowing material to leave the inlet device.

5. A waste tank according to claim 4, wherein the opening in the end plate has a central portion that lies on the central axis of the separator tube and a slot-form portion that extends substantially radially from the central portion of the opening.

6. A waste tank according to claim 5, comprising a second plate attached to the end plate and extending substantially parallel to the axis of the separator tube, the second plate having a deflector portion extending adjacent the slot-form portion of the opening in the end plate, and a draft tube portion extending at least partially around the central portion of the opening in the end plate.

7. A waste tank according to claim 3, wherein the separator tube is formed with an opening in its wall for allowing sewage to leave the inlet device.

8. A waste tank according to claim 1, wherein the inlet device comprises an inlet tube, an inlet box into which the inlet tube debouches by way of the inlet opening, the inlet box being of greater cross-sectional area than the inlet tube and being in communication with the interior space of the tank, and a deflector plate mounted in spaced relationship from the inlet opening and extending transversely relative to the central axis of the inlet opening, whereby sewage entering the tank by way of the inlet opening at high speed strikes the deflector plate.

9. A waste tank according to claim 1, further comprising an outlet device coupled to the outlet opening for separating waste from air that enters the outlet device and returning the separated waste to the receptacle portion of the tank.

10. A waste tank according to claim 9, wherein the outlet device comprises a duct having an inlet end disposed inside the tank and also having an outlet end, wall means defining a chamber into which said duct opens, the chamber being of larger cross-sectional area than the duct, drop collection means disposed in the chamber for retaining waste entrained with the flow of air entering the chamber, and means for returning waste from the chamber to the interior of the tank.

11. A waste tank according to claim 9, wherein the outlet device is a cyclonic separator comprising first and second ducts which are in end-to-end alignment but are spaced from each other, inlet means for introducing air into the first duct in a manner such as to impart a rotational component of velocity to the air, and a shell which is coupled to the first and second ducts and has a wall portion which is at a greater distance from the central axis of the first and second ducts than the walls of the first and second ducts and is disposed so that it extends over a portion of the common axis corresponding to the space between the first and second ducts.

12. A waste tank according to claim 1, comprising a closure member which is disposed above the maximum filling level for inhibiting entry of waste into the outlet opening.

13. A waste tank according to claim 12, comprising an outlet duct that extends toward said outlet opening, the outlet duct defining an inlet port and extending vertically upwards for the inlet port, and wherein the closure member is a generally circular reversing member that has an outer periphery and is secured relative to the inlet port at a position inward of its outer periphery, the closure member having a first condition in which its outer periphery is below the inlet port of the outlet duct and air that enters the tank is able to enter the outlet duct, and a second conditioning which the outer periphery engages the outlet duct about the inlet port and inhibits entry of waste into the outlet duct.

14. A waste tank according to claim 13, wherein the closure member is made at least partially of silicone rubber and its thickness decreases over at least a part of the range of its radius from its outer periphery towards its center.

15. A waste tank according to claim 12, comprising an outlet duct that extends toward said outlet opening, the outlet duct defining an inlet port and extending vertically downwards from the inlet port, and wherein the tank has a generally horizontal top wall portion that extends over the inlet port and in spaced relationship therewith and the closure member is an annular reversing member having an inner periphery and an outer periphery, the closure member being secured at its inner periphery about the inlet port of the outlet duct and having a first condition in which the outer periphery is below the top wall portion of the tank and air that enters the tank is able to pass to the inlet port, and a second condition in which the outer periphery engages the top wall portion of the tank and inhibits entry of waste into the outlet duct.

16. A waste tank according to claim 15, wherein the closure member is made at least partially of silicone rubber and its thickness decreases over at least a part of the range of its radius from its outer periphery to its inner periphery.

17. A waste tank according to claim 1, further comprising a dome structure which is in open communication with the receptacle portion and projects upwardly from the receptacle portion, above the maximum filling level of the tank, and wherein the inlet opening and the outlet opening are defined by the dome structure.

18. A waste tank according to claim 17, wherein the dome structure has a side wall and a top wall and the inlet opening and the outlet opening are formed in the side wall.

19. A passenger transport vehicle having a vacuum sewage system which comprises at least one sewage-providing unit installed in said passenger transport vehicle, a waste tank defining an inlet opening and an outlet opening, a sewer pipe connecting the sewage-providing unit to the inlet opening, a vacuum generator, and an exhaust duct connecting the vacuum generator to the outlet opening for establishing a partial vacuum in the waste tank, said tank comprising a receptacle portion for receiving sewage up to a predetermined maximum filling level, which is below the inlet opening and the outlet opening, and the tank also comprising an inlet device which is coupled to the inlet opening and is effective to separate air and sewage entering the tank using the kinetic energy of the sewage, and thereby dissipate kinetic energy of the sewage.

20. A transport vehicle according to claim 19, being an aircraft.

21. A transport vehicle according to claim 20, wherein the tank defines a drain outlet for draining sewage for the tank when the aircraft is stationary.

22. A waste tank according to claim 1, wherein the tank defines a drain outlet for draining sewage from the tank when the vehicle is stationary.

23. A waste tank according to claim 4, wherein the opening in the end plate is substantially circular and lies on the axis of the separator tube, and the separator further comprises a draft tube attached to the ned plate and surrounding the opening therein.

* * * * *